(12) United States Patent
DeCosta (10) Patent No.: US 7,692,094 B1
(45) Date of Patent: Apr. 6, 2010

(54) ANGULARLY POSITIONABLE CONNECTOR AND WALL PLATE COMBINATION FOR SECTIONAL PLATE

(76) Inventor: Thomas J. DeCosta, P.O. Box 70189, North Dartmouth, MA (US) 02747

( * ) Notice: Subject to any disclaimer, the term of this patent is extended or adjusted under 35 U.S.C. 154(b) by 0 days.

(21) Appl. No.: 12/316,774

(22) Filed: Dec. 16, 2008

Related U.S. Application Data (60) Provisional application No. 61/007,939, filed on Dec. 17, 2007.

(51) Int. Cl.
*H02G 3/14* (2006.01)
(52) U.S. Cl. .......................... 174/66; 439/536; 439/173
(58) Field of Classification Search .................. 439/172, 439/170, 174, 954, 536; 174/66, 67, 53
See application file for complete search history.

(56) References Cited

U.S. PATENT DOCUMENTS

| | | | | | |
|---|---|---|---|---|---|
| 3,729,572 | A | * | 4/1973 | Helin | 174/66 |
| 4,027,097 | A | * | 5/1977 | Gillemot | 174/66 |

* cited by examiner

*Primary Examiner*—Phuong K Dinh (57) ABSTRACT

The present invention relates to wall plates for electrical wiring, and more specifically, to a plate including an opening for securing a connector or plurality of connectors therein. The plate includes a dual use opening at its center including cutouts that allow for a connector to be rotated at increments of 45 degrees up to 360 degree rotation at an angle in line to the angle of its receiving connector. Such angular mating requirements may originate from audio, video, and telecommunications applications where equipment is positioned at different elevations and distances away from an installed connector plate.

9 Claims, 11 Drawing Sheets

ANGULARLY POSITIONABLE CONNECTOR AND WALL PLATE COMBINATION FOR SECTIONAL PLATE

CROSS-REFERENCE TO RELATED APPLICATIONS

This application claims the benefit of U.S. Provisional Application No. 61/007,939 filed 17 Dec. 2007.

BACKGROUND OF THE INVENTION

1. Field of the Invention

The present invention relates to wall plates for electrical wiring, and more specifically, to a plate including an opening for securing a connector or plurality of connectors therein, the connector having an engagement recess for slideably engaging the opening. The plate is capable of being separated, then reconnected and securely interlocked at its mating end to allow for angular adjustment of the secured connector. The plate also includes a breakaway panel to facilitate the attachment of a plurality of connectors when a single angular adjustable connector is not required. The plate may be secured to standard gem boxes.

2. Description of Related Art

Wall plates to cover electrical devices mounted in gem boxes are well known in the art. Wall box mounted devices such as switches and receptacles are commonly provided with a wall plate serving both as a decorative cover for the device and to prevent access to the areas which contain the electrical wiring. Such wall plates are usually mounted upon the device by one or more screws passing through openings in the plate and received in a threaded aperture in the device. In some installations, two or more devices are mounted in side-by-side relation with a corresponding wall plate for each device.

Other types of wall plates include plates that can be interlocked at their sides to provide for interchangeable wall panel assemblies for each configuration of electrical devices in any number of ganged gem boxes. Each wall plate includes specific openings or apertures to accommodate various electrical devices secured therein.

However, there exists a need for a plate that allows for the aperture to be split then reconnected, to allow for the adjustment of a secured connector at different' angles. There also exists a need for a dual use split plate that includes breakaway pieces to facilitate the attachment of a plurality of connectors when a single angular adjustable connector is not required. Furthermore, there exists a need for the connected plate to withstand the pulling forces of wires and connectors that would otherwise separate the connected plate. By utilizing "overmolded" connectors comprising engagement channels, the joined split plate halves that engage the connector channels' hold the complete plate together and reinforce its mating strength.

SUMMARY OF THE INVENTION

The foregoing and other problems are overcome, and other advantages are realized, in accordance with the disclosed, alternative embodiments of these teachings.

The present invention relates to wall plates for electrical wiring, and more specifically, to a plate including an opening for securing a connector or plurality of connectors therein. The plate includes a dual use opening at its center including cutouts that allow for a connector to be rotated, in the preferred embodiment, at increments of 45 degrees up to 360 degree rotation at an angle in line to the angle of its receiving connector. Such angular mating requirements may originate from audio, video, and telecommunications applications where equipment is positioned at different elevations and distances away from an installed connector plate.

The plate can be easily separated then reconnected and interlocked at its center to achieve a different angular orientation of the connector therein. The plate also includes a breakaway panel to facilitate the attachment of a plurality of connectors when a single angular adjustable connector is not required. The breakaway panels form part of the center of the plate sections and are at a reduced thickness for easy detachment of the panels when securing a plurality of connectors. For a single angularly adjustable connector, the breakaway panels are retained and contribute to maintaining the structural integrity of the secured connector.

The plate can be interlocked and secured to standard gem boxes and may include extender sections to increase the size of the opening. The plate interlocking, means is designed to withstand the pulling forces of wires and connectors passing through the opening. By utilizing "overmolded" connectors comprising engagement channels the joined split plate halves that engage the connector channels hold the complete plate together and reinforce its mating strength. The invention comprises a first plate section and identical second plate section that are mateable for easy separation and attachment. In the preferred embodiment, both first and second plate sections include cantilever tab-like elements known in the art that extend from the ends of each plate section to join the plates.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

While certain embodiments of the present invention have been illustrated and described herein, the present invention should not be limited to such illustrations and descriptions. It should be apparent to those skilled in the art that changes and modifications may be incorporated and embodied as part of the present invention and are within the scope of the claims.

Figure 1:
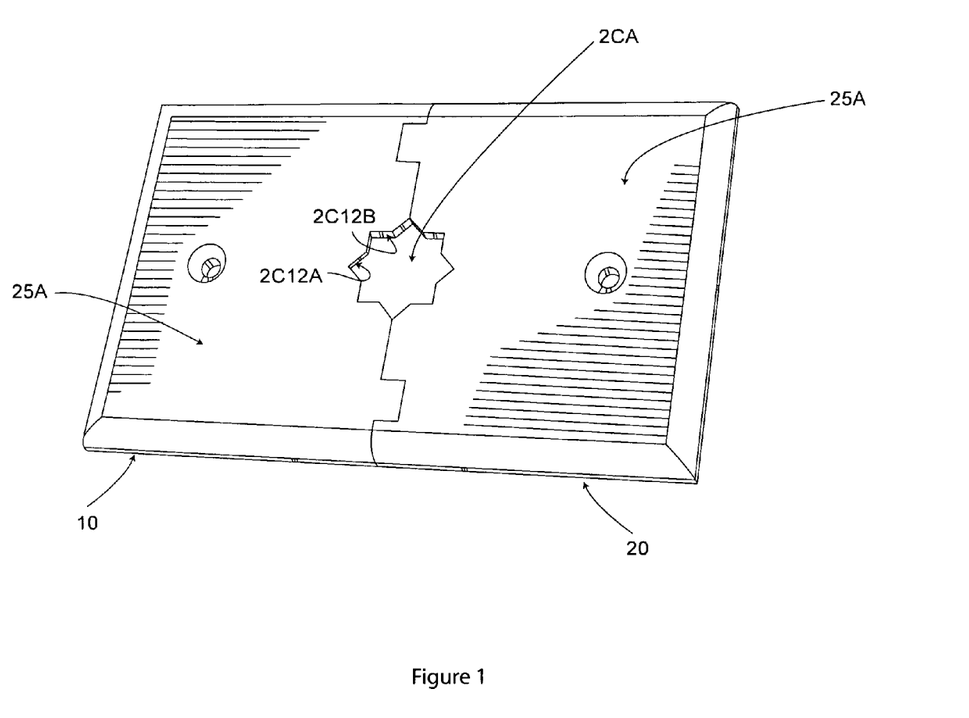
FIG. 1 illustrates an embodiment of subject invention in a single-connector configuration illustrating the center cutout and breakaway members, the plate illustrated having a first and second plate joined together, the plate not including an installed connector.
Figure 7:
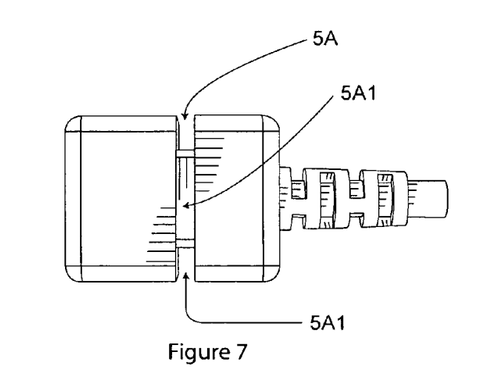
FIG. 7 is a side view of the connector of FIG. 6.
Figure 8:
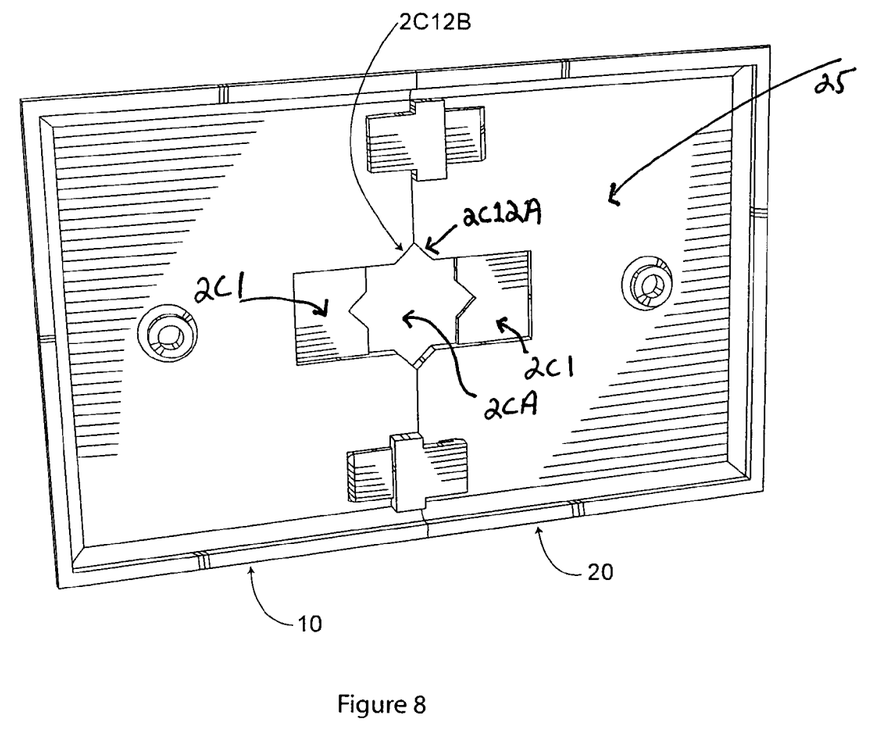
FIG. 8 is a bottom view of the plate of FIG. 1.
Figure 9:
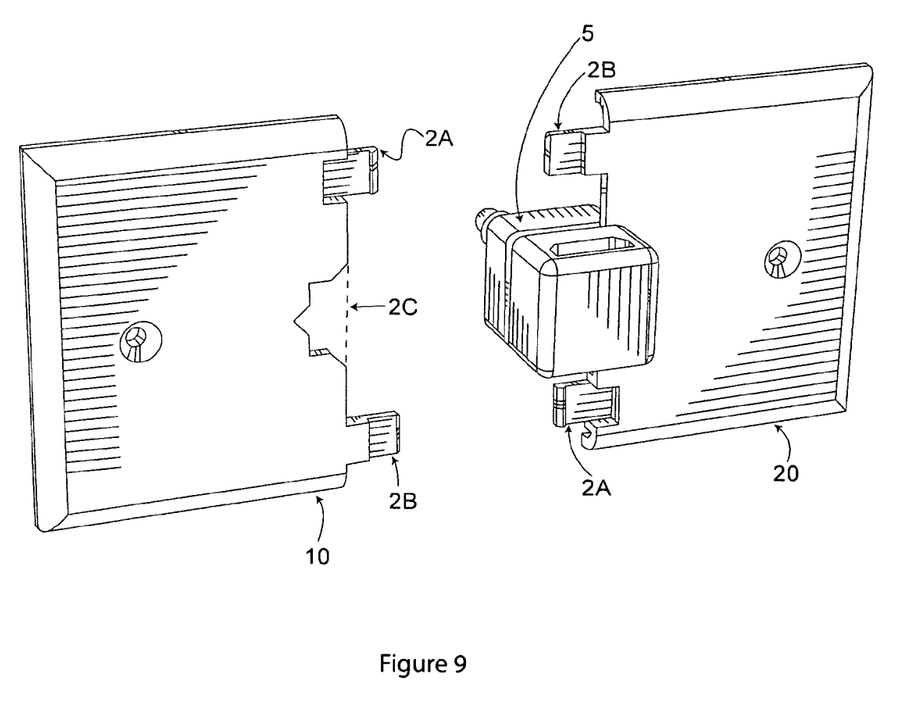
FIG. 9 is a separated view of the plate of FIG. 1 illustrating a connector secured to a plate half prior to each plate being secured to form a complete plate.
Figure 10:
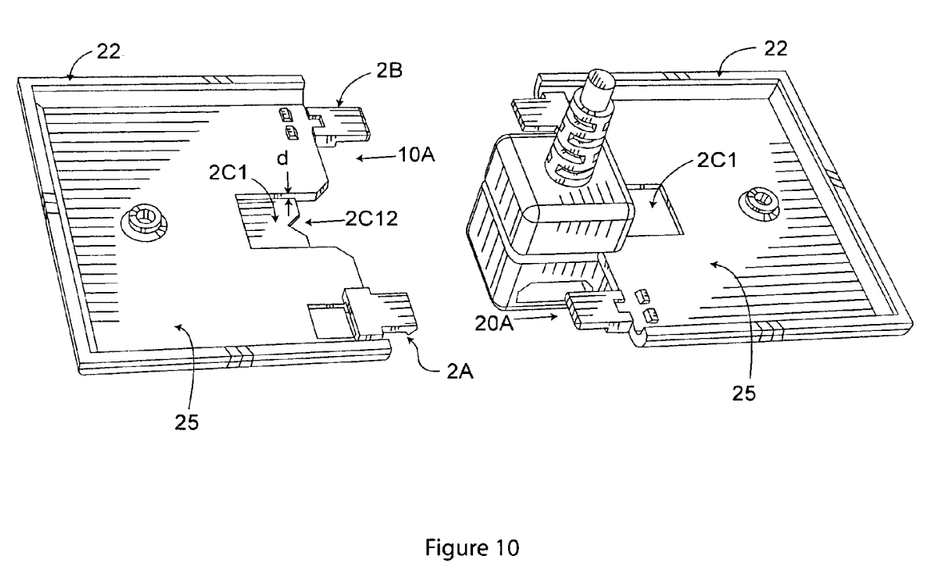
FIG. 10 illustrates a bottom view of the separated plate of FIG. 9.

Referring to the drawings (FIGS. 1-13) of the invention in detail, FIG. 1 illustrates an embodiment of the present invention comprising a connected first plate section 10 and second plate section 20, prior to having a connector 5 installed. FIG. 8 illustrates a bottom view of the assembled plate sections 10 and 20 of FIG. 1. These first and second plate sections are constructed for easy separation and engagement with each other. Plate sections 10 and 20 utilize engagement tabs known in the art for separating and attaching plate sections to form a complete plate. In one illustrative embodiment, one example of engagement tabs 2A and 2B is disclosed in FIGS. 1-13. In this example, engagement tabs 2A and 2B are identical for plate sections 10 and 20 as illustrated in FIG. 10. Another example of engagement tabs is described in U.S. Pat. No. 7,112,744, issued Sep. 26, 2006, to applicant.

Figure 12:
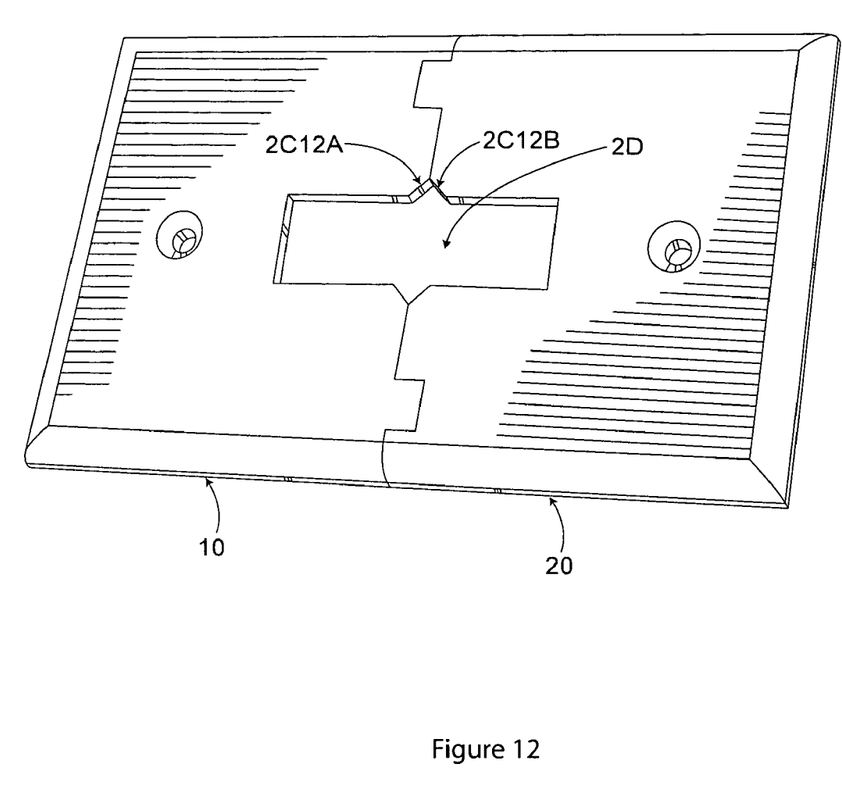
FIG. 12 illustrates the plate of FIG. 1 with the breakaway panel removed.
Figure 13:
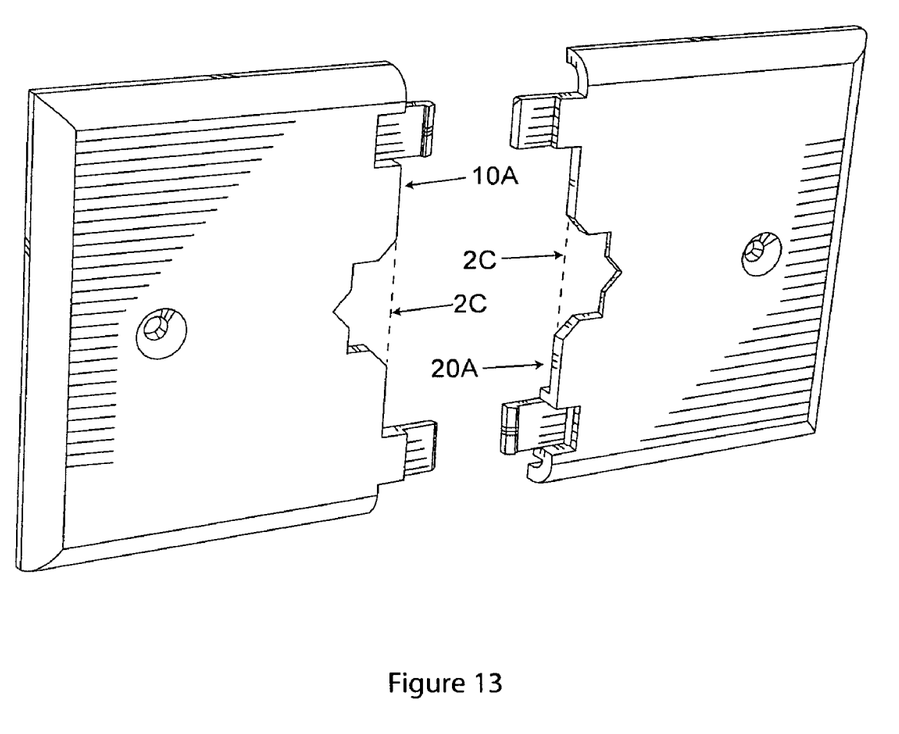
FIG. 13 illustrates the plate of FIG. 1 separated prior to being interlocked.

In the preferred embodiment, Plate sections 10 and 20 include a bottom surface 25 that includes a sidewall extension 22, as illustrated in FIG. 10. Extension 22 projects outward from bottom surface 25 extending around the periphery of the plate sections 10 and 20 forming a lip therearound. First plate section 10 includes an end section 10A that engages an end section 20A of second plate section 20. As illustrated in FIGS. 1 and 13, end sections 10A and 20A each include an opening 2C (FIG. 13) to form a complete opening 2CA (FIG. 1) for the insertion of a mateable connector 5 when plate sections 10 and 20 are interlocked. Breakaway panel 2C1 can be broken away from plates 10 and 20 to achieve an alternate opening 2D, as illustrated in FIG. 12.

Figure 3:
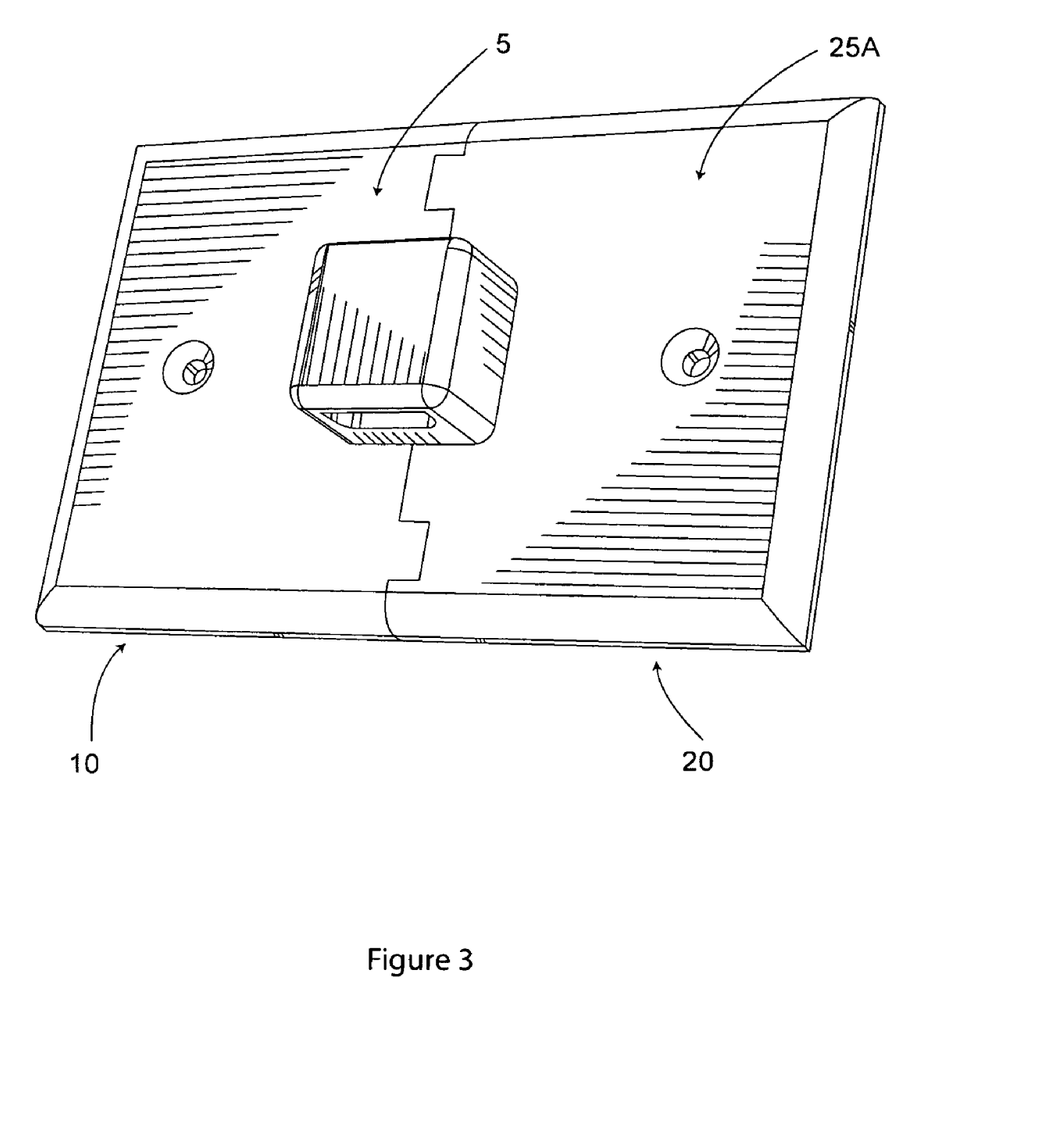
FIG. 3 illustrates a top view of the plate of FIG. 1, with a connector installed.

As illustrated in FIGS. 1 and 10, breakaway panels 2C1 form part of the mold of plate sections 10 and 20. In the preferred embodiment, panels 2C1 are flush with plate section 10 and 20 top surface 25A, as illustrated in FIG. 1. The thickness of breakaway panel 2C1 is determined to allow for easy breakaway for expansion of opening 2CA when desired and allowing for expansion forces of an inserted connector in an embodiment where breakaway panel 2C1 is left in place, as illustrated in FIGS. 3 and 10. In the preferred embodiment, breakaway panel 2C1 is recessed a distance "d" from bottom surface 25 due to its thickness, as illustrated in FIG. 10.

Figure 2:
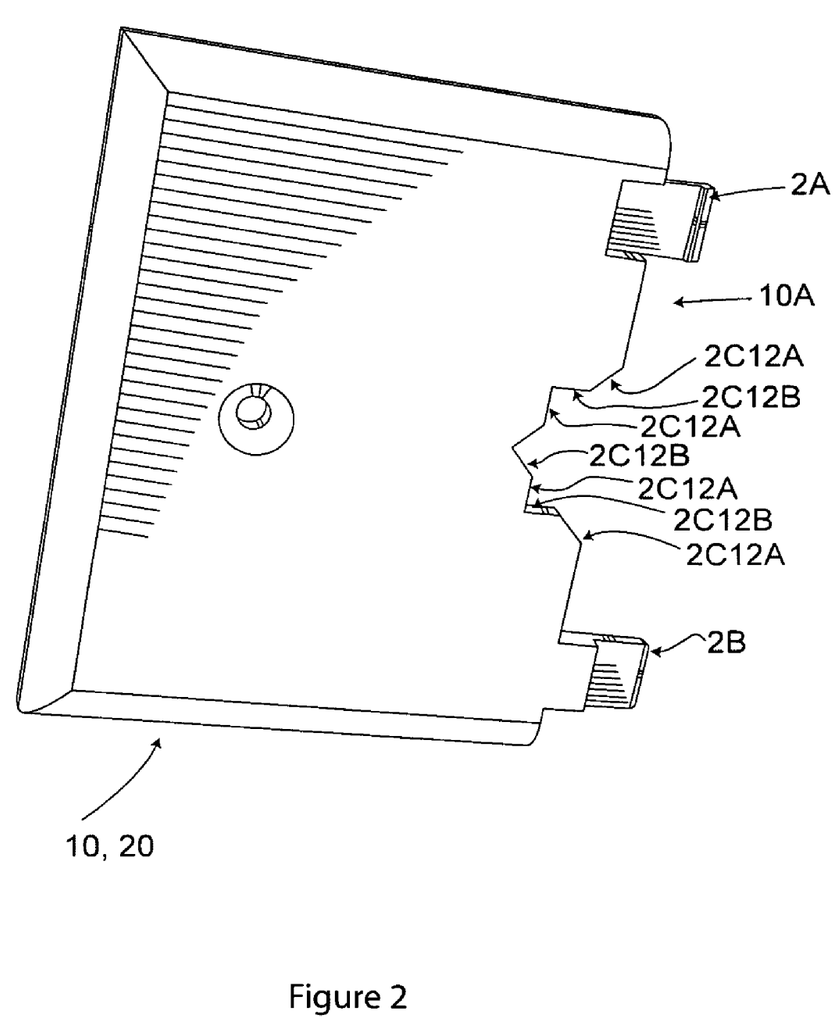
FIG. 2 illustrates the plate section utilized in subject invention, the plate sections being mirror images of one another.

Referring to FIGS. 2 and 10, breakaway panel 2C1 includes an end section 2C12 that includes angled cutouts 2C12A and 2C12B that are repeated along the periphery of opening 2C and include angled cutouts on both breakaway panel 2C1 and plate end section 10A. The cutout sections define the opening 2C (FIG. 13), which in the preferred embodiment, is in the center of end sections 10A and 20A. In the preferred embodiment, end section 10A and end section 20A are identical as illustrated in FIG. 13.

Figure 5:
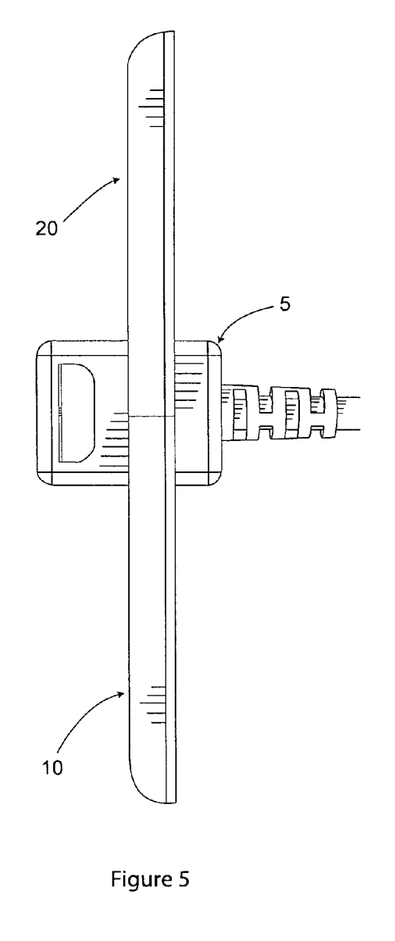
FIG. 5 illustrates a side view of the plate of FIG. 1, with a connector installed.
Figure 6:
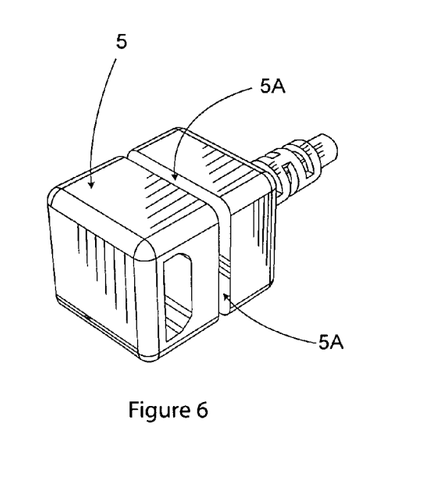
FIG. 6 illustrates a perspective view of a typical connector utilized in subject invention.

A complete opening includes angular cutouts 2C12A and 2C12B repeated along the periphery of opening 2CA when plates 10 and 20 are joined as illustrated, in FIG. 1. Angular cutouts 2C12A and 2C12B may have different angular patterns depending on the desired adjustability of a connector inserted within opening 2CA. In the preferred embodiment the angled cutouts are 45 degrees with respect to each other. Referring to FIGS. 5-7, a connector 5 is disclosed for use in the present invention.

It is understood that any type or shape of connector 5 may be utilized with the present invention provided it includes a channel or recess for attachment to the plate as herein described. The connector 5 is designed to include a channel 5A cut within its body as illustrated in FIGS. 6 and 7. Channel 5A is of sufficient width to slideably engage and snugly fit angled cutouts 2C12A and 2C12B, repeated along the periphery of opening 2C, into channel 5A up to a point where connector 5 bottom surface 5A1 contacts the periphery of opening 2C, and depending on the angular orientation of the inserted connector 5, fixes connector 5 at a desired angular orientation. The connector 5 becomes fixed when the angle of bottom surface 5A1 is at the same angle as the contacting angular cutouts of opening 2C. The channel 5A of connector 5 may be made by any means known in the art including over-molding an existing connector.

It is understood that any angular configuration of connector 5 bottom surface 5A1 and opening 2CA may be utilized in subject invention to provide an angularly adjustable connector that may be rotated in angular increments to a desired orientation.

Figure 4:
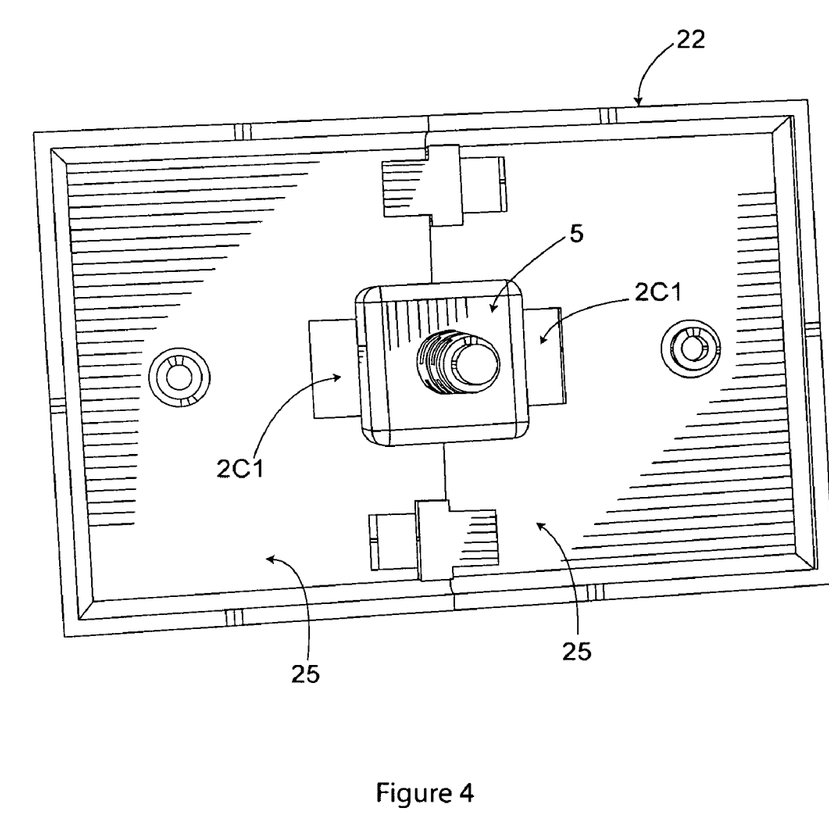
FIG. 4 illustrates a bottom view of the plate of FIG. 1, with a connector installed.

In practice, the connector 5 would first be engaged with plate section 10 or 20 at a desired angular orientation (FIG. 10). Next, connector 5 would engage plate section 10 and 20 up to a point' where the plates are interlocked and the connector 5 slideably engages and snugly fits end section 2C12 of both plate sections 10 and 20, as illustrated in FIGS. 3 and 4.

Figure 11:
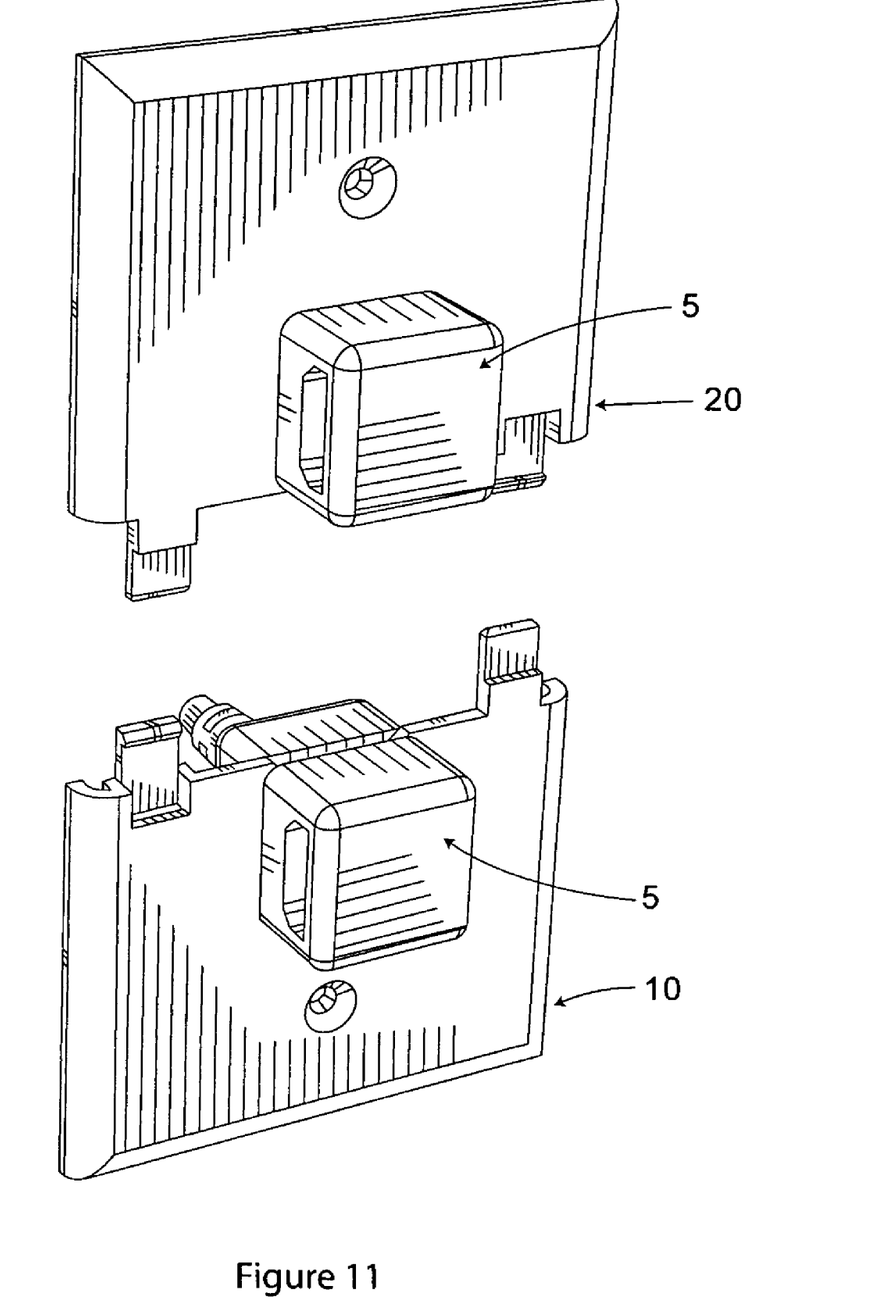
FIG. 11 illustrates the plate of FIG. 1 having multiple connectors installed therein.

Connector 5 may be angularly rotated to a different installation angle by separating plates 10 and 20, disengaging connector 5 from plates 10 and 20, rotating connector 5 to another angular orientation defined by cutouts 2C12A and 2C12B, then reengaging as previously described. For applications where a plurality of connectors is required, breakaway panels 2C1 are removed and multiple connectors 5 slideably engage plates 10 and 20 in a single angular orientation as illustrated in FIG. 11.

It is understood that the size of the plate sections and openings therein may be configured for a single or multiple gang connector configurations and various sized connectors, according to a particular application. It is understood that these variations are within the scope of the present invention. It is further understood that although preferred embodiments have been disclosed it is understood that changes and/or variations or equivalents to the preferred embodiments are within the scope of the claims.

I claim:

1. An angularly positionable connector and wall plate combination for a sectional plate, the sectional plate having a first and second section, each first and second section having an end section, each end section further comprising a locking mechanism to secure said first and second sections, the positionable connector and wall plate combination comprising:
   first and second openings disposed within said first and second end sections, said first and second openings comprising a plurality of angular adjustments; and
   a connector having a channel therein, said channel adapted to engage said first and second openings at said plurality of angular adjustments, to orient said connector to a desired position.

2. The angularly positionable connector and wall plate combination of claim 1, wherein said first and second openings further comprise a breakaway panel, wherein said breakaway panel includes at least one angular adjustment of said plurality of angular adjustments, said breakaway panel being detachable.

3. The angularly positionable connector and wall plate combination of claim 2, wherein said breakaway panel includes staggered attachment bonds to first and second sections to facilitate easy detachment.

4. The angularly positionable connector and wall plate combination of claim 1, wherein said plurality of angular adjustments comprise a plurality of angled cutouts at the periphery of said first and second openings.

5. The angularly positionable connector and wall plate combination of claim 4, wherein said channel of said connector includes a bottom surface, wherein said plurality of angled cutouts of said first and second openings of said end sections slideably engage said channel of said connector up to a point where said bottom surface of said channel of said connector contacts said angled cutouts.

6. The angularly positionable connector and wall plate combination of claim 5, wherein said contact between said bottom surface and said angled cutouts fixes said connector in a desired angular orientation.

7. The angularly positionable connector and wall plate combination of claim 6, wherein said first and second sections of said sectional plate are secured by said locking mechanism when said angled cutouts of said openings of said end sections of said first and second sections are in contact with said bottom surface of said channel of said connector.

8. An angularly positionable connector and wall plate combination for a sectional plate, the sectional plate having a first and second section, each first and second section having an end section, each end section further comprising a locking mechanism to secure said first and second sections, the connector having a channel therein, the positionable connector and wall plate combination comprising:

first and second openings disposed within said first and second end sections, said first and second openings comprising a plurality of angular adjustments, said channel of said connector adapted to engage said first and second openings at said plurality of angular adjustments, to orient said connector to a desired position.

9. An angularly positionable connector and wall plate combination for a sectional plate of claim 4, wherein said plurality of angular cutouts are at a 45 degree angle.

\* \* \* \* \*